United States Patent Office 3,377,010
Patented Apr. 9, 1968

3,377,010
APPARATUS FOR SPOT WELDING A PLURALITY OF METAL PLATES BY DETONATION OF AN EXPLOSIVE
Teruhiko Suzuki, Masayuki Kameishi, and Kazumoto Yamamoto, Nobeoka-shi, Japan, assignors to Asahi Kasei Kogyo Kabushiki Kaisha, Osaka, Japan, a corporation of Japan
Original application Nov. 5, 1963, Ser. No. 321,590. Divided and this application Mar. 21, 1967, Ser. No. 624,890
11 Claims. (Cl. 228—3)

ABSTRACT OF THE DISCLOSURE

Spot welding apparatus comprising a cylindrical container having a base which is adapted for being placed on the outer surface of an outer plate of a number of plates to be spot welded together. An explosive is contained within the container. The base has an inner surface of convex shape to concentrate the force produced by detonation of the explosive in a localized area. The container is circumferentially cut away at its lower edge to minimize the presence of the pressure trace on the outer surface of the plate.

CROSS-RELATED APPLICATIONS

This is a divisional application of Ser. No. 321,590 filed Nov. 5, 1963.

BRIEF SUMMARY OF THE INVENTION

This invention relates to apparatus for effecting spot pressure welding of a plurality of metal plates of the same or different materials by explosives with improvements to overcome various shortcomings which have heretofore appeared in the customary welding methods and with the object of carrying out efficient and reliable spot welding.

In customary welding methods such as gas welding, arc welding, electric resistance welding, etc., every metal plate to be welded must be heated to such a high temperature that the metallographic structure tends to change or a layer of alloys is formed, resulting frequently in serious decrease in the mechanical and chemical properties of the welded parts. Particularly in the welding of anti-corrosive metals, special techniques are required to control the temperature to within one degree. It is theoretically possible to carry out welding of thin plates less than 1 mm. thick, but in actual practice it is almost impossible. Almost all the customary welding machines are so large in size that their applicability is restricted because of the available working space.

Recently, supersonic wave welding and friction welding have appeared as methods of lessening the thermal effect on the metal to be welded, but neither of these welding methods can be applied directly to large size structures due to their complicated apparatus. Explosive pressure welding methods have been developed and have made it possible to carry out the pressure welding of metal plates, which has heretofore been considered difficult, however, the entire surfaces of the metal plates must be pressure-welded in the aforementioned method, so that a large amount of explosive is required and the welding cannot be applied at any desired position due to its difficult handling and the large noise of the explosion. Further, it is also troublesome in the aforementioned welding method to provide a definite space between the metal plates to be pressure-welded or to use a support especially for that purpose.

An object of the present invention is to provide apparatus for the spot welding of a plurality of metal plates consisting of the same or different materials, by the detonation of explosives.

According to the invention, a shell is utilized to receive an explosive whichupon detonation applies local pressure to the plates through a base of the shell whereby the plates are spot welded by pressure.

BRIEF DESCRIPTION OF THE DRAWING

In the attached drawing:
FIGURE 5a is a side view of a cartridge or shell for containing an explosive;
FIGURE 5b is a modification of the shell of FIG. 5a.

DETAILED DESCRIPTION OF THE INVENTION

Figure 1:
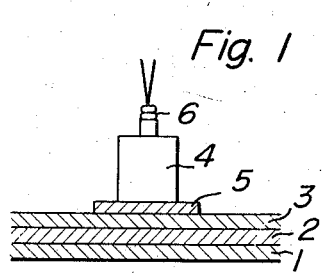
FIGURE 1 is a side view diagrammatically showing the explosive spot welding operation according to the invention.

Referring to the drawings, FIG. 1 represents a side view showing the welding principle of the present invention wherein metal plates 1, 2 and 3 to be pressure-welded are put one upon another and the explosive 4 is placed via a medium or buffer member 5 on a free surface of metal plate 3, and metal plates 1, 2 and 3 are locally pressure-welded to one another by detonating explosive 4 by use of a detonator 6.

Figure 2:
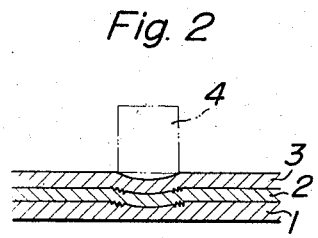
FIGURE 2 is a side view showing the material after the spot welding operation has been effected.

A section through the pressure-welded metals is shown in FIG. 2 and the pressure traces are brought about on metal plates 1, 2 and 3 at the positions opposite to that of the explosive 4 while the pressure welding is brought about by forming small wrinkles at the positions in the mutual contact surface of metal plates opposite to the circumference of the explosive cartridge bottom. Accordingly, the pressure-welded parts form ring-wise shapes in a plan view.

In carrying out the spot welding of the present invention, if the surfaces corresponding to the parts of metal plates to be pressure-welded are dirty with a layer of oxides, anti-corrosive film, dust, oil, water, or other contaminants, it is necessary to clean such surfaces by a chemical treatment employing acid, alkali, or volatile solvents, etc., or by a mechanical treatment employing sand paper, grinder, grit blast, etc. Otherwise it is impossible to carry out the pressure-welding or to obtain a sufficient strength of pressure-welding. Naturally, such a treatment is not necessary if the metal surface is clean. It is possible, with metal plates placed one upon another, to apply the spot welding of the present invention to metal plates (hereafter referred to as "layer plates") of 4 mm. in combined thickness other than the metal plate at the other side where the explosive is not disposed (hereafter referred to as the "base plate").

Figure 3:
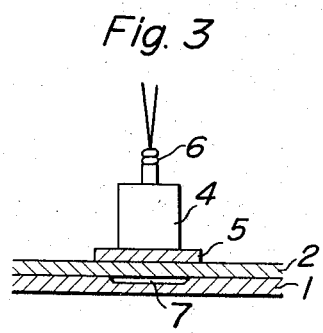
FIGURE 3 is a side view showing a modification of the arrangement of FIG. 1.

However, when a 2 mm. thick metal plate is used as one of a plurality of layer plates put one upon another, or such metal plates relatively poor in ductility such as titanium, stainless steel, etc., of over 1.5 mm. in thickness are used, the pressure-welding strength may become somewhat weak, if no space is provided between adjacent plates before the pressure welding is carried out. Thus, as indicated in FIG. 3, after a hollow 7 of between one and two times the area of that of the explosive cartridge bottom has been formed in advance on the part of base plate 1 to be pressure-welded by mechanical or chemical means, the layer plates are superposed on base 1 and the explosive 4 is disposed via a medium 5 right over the hollow, a detonation with use of a detonator 6 brings about a good pressure welding. The depth of the hollow is not of severe restriction, and it ranges between 0.1 to 1 mm. and is gradually increased depending on the plate thickness or ductility.

Further, the area of the hollow is, as aforementioned, in a range between one and two times that of the explosive cartridge bottom, and no advantageous effect is obtained beyond this range.

The hollow can be formed by mechanical means such as by a grinder or grit blast or by a chemical means such as an etching agent, the former being preferred.

The medium or buffer member of the present invention serves to prevent direct contact of the high pressure hot gases generated by detonation with the metal surface of the upper plate thereby avoiding scarring of the metal plate and undesirable thermal influence. Said medium may be constituted of fibrous material such as paper, fabric, wood, etc., or high polymer materials such as rubber, synthetic resin, etc. If these media are composed of metal or mineral materials they prevent adverse influence of hot gas, but their use is not practical because the metal surface can be impaired by fragments therefrom.

Figure 4:
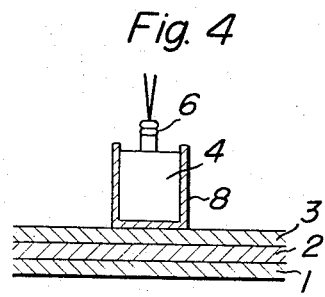
FIGURE 4 is a side view showing a further modification of the arrangement of FIG. 1.

The spot welding method of the present invention can be effected, as indicated in FIG. 4, with an explosive cartridge, in which an explosive is charged in a shell 8 consisting of fibrous material or high polymer material, the bottom of the shell 8 serving as the aforementioned medium.

Figures 5A, 5B:
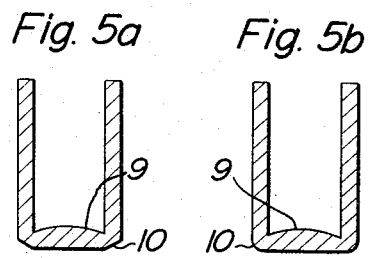

FIGS. 5(a) and (b) illustrate the construction of the shell for carrying out more effectively the spot welding of the present invention showing how the detonation pressure of the explosive can be concentrated on the metal surfaces to be pressure-welded by forming the bottom of the shell with an inner spherical surface 9.

Figure 6:
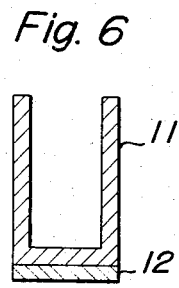
FIGURE 6 shows another modification in the cartridge.

Furthermore, the contour of the pressure trace formed on the metal surface after the spot welding can be made indistinct, while the hardening around the pressure trace can be controlled by forming a cut-off portion 10 around the circumference of the bottom of the shell to thereby eliminate sharp corners. Furthermore, as shown in FIG. 6, a non-metallic adhesive or a piece of tape both surfaces of which are coated with non-metallic adhesive, can be provided on the bottom surface of the shell 11. Thereby, the explosive cartridge can be readily secured to various surfaces such as walls and ceilings.

Figure 7:
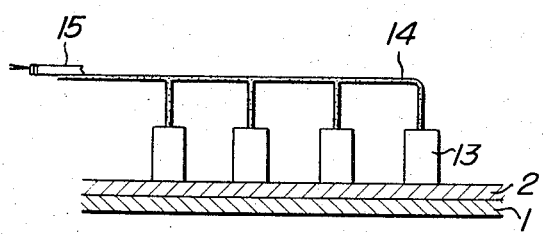
FIGURES 7 and 8 respectively show arrangements by which spot welding can be effected at a multiplicity of positions.
Figure 8:
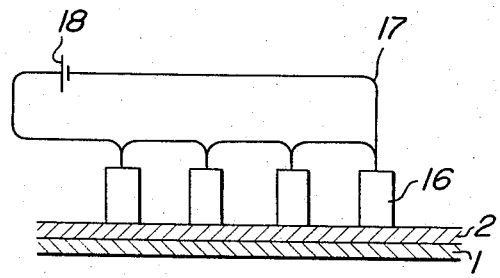

It is possible to effect spot welding at a multiplicity of locations in a very short length of time. FIG. 7, for instance, shows an arrangement wherein the base plate 1 and layer plate 2, both having substantial extent, are subjected to the spot welding at a multiplicity of positions at which are placed cartridges 13. The explosive of the cartridges 13 are connected by a detonating fuse 14. The detonation is initiated from one end by a detonator 15 whereby the pressure welding of the aforementioned base plate 1 and layer plate 2 is effected successively at the multiplicity of positions by successive detonations of each explosive cartridge in a very short length of time. FIG. 8 shows a method of carrying out the pressure welding electrically at a multiplicity of positions, wherein explosive cartridges 16 having an integrated construction of the explosive with electric igniter, which has heretofore been known, are disposed on the surface of the layer plate 2 at the desired positions and are connected in series with a wire 17 for electric ignition, the detonation of each explosive cartridge 16 in a very short length of time producing pressure welding by connecting wire 17 with a battery 18. The explosives to be employed in the spot welding of the present invention are secondary explosives such as hexogen, PETN, tetryl, TNT, etc., or a priming composition such as fulminate of mercury DDNP, etc., and the kind and quantity of the explosives are determined according to the circumstances employed, especially on the thickness and quality of the metal plates to be pressure-welded.

Example 1

A 1 mm. thick titanium plate (JIS ST–60) of 50 by 50 mm. area was put upon a base constituted by a 9 mm. thick mild steel plate (JIS SS–41) of 50 by 50 mm. area. An explosive cartridge was provided wherein 1.2 g. of PETN was charged under 150 kg./cm$^2$ into a polystyrene shell, 10 mm. in inside diameter, 2 mm. in side wall thickness, 1.5 mm. in bottom plate thickness and 50 mm. high. Complete pressure welding of the aforementioned metal plates was effected through detonation employing 0.3 g. of DDNP as a detonator.

Example 2

A cylindrical shell was formed from polyvinyl chloride with a 10 mm. inside diameter, 2 mm. thickness and 50 mm. height. The bottom inner surface of the base was formed as a spherical surface of 24 mm. radius as indicated in FIG. 5(a), and the outer lower circumferential edge was cutoff at a 30° angle at a distance 5 mm. from the axis of the shell. A 1 mm. thick stainless steel plate (JIS SUS27) of 50 by 50 area, was placed on a 9 mm. thick mild steel base plate (JIS SS–41) of the same area as that of the 1 mm. plate.

The shell contained 1.2 g. of PETN charged under a pressure of 250 kg./cm.$^2$ and 0.3 g. of DDNP charged as a detonator under no compression. The shell was disposed at the center of the upper stainless steel plate. Complete pressure welding of the aforementioned two metal plates was effected through detonation, where the maximum depth of the pressure trace was 0.62 mm., but the contour of the pressure trace was indistinct (sample number 1).

A shell which did not have any cut-off around the lower circumference of the aforementioned shell was utilized to effect pressure welding in the same manner as that hereinabove, resulting in complete pressure welding of the metal plates, but the maximum depth of the pressure trace was 0.60 mm. and the contour of the pressure welding was very distinct (sample number 2).

The hardness of the pressure trace on the stainless steel plate surface was determined for samples 1 and 2 respectively. The results obtained are as follows:

| Position from the center of pressure trace (mm.) | Sample Number (HV) | | Remarks |
|---|---|---|---|
| | 1 | 2 | |
| 3.0 | 235 | 235 | |
| 4.0 | 237 | 234 | |
| 5.0 | 240 | 244 | |
| 6.0 | 251 | 275 | |
| 6.5 | 258 | 320 | Corresponding to contour of pressure trace. |
| 7.0 | 261 | 377 | |
| 7.5 | 264 | 359 | |
| 8.0 | 243 | 298 | |
| 9.0 | 237 | 251 | |

Example 3

Polystyrene shells were utilized herein of cylindrical form with a 10 mm. inside diameter, 2 mm. thickness and 50 mm. height. The bottom inner surface of the base was formed as a spherical surface of 24 mm. radius as indicated in FIG. 5(b), and the outer lower circumferential edge of the shell was cut-off along a 2 mm. radius on one class of samples (shells A) and left alone in another class of samples (shells B). The pressure welding was effected utilizing the repective shells in the same manner and conditions as in Example 2, resulting in complete pressure welding in every case. The maximum hardness at the contour of the pressure trace on the stainless steel plate was 278 HV for shells A and 383 HV for shells B.

Example 4

A base of 12 mm. thick mild steel plate (JIS SS–41) of 1,000 by 100 mm. area and a 1 mm. thick titanium plate (JIS ST–50) of the same area as that of the base were employed as the materials to be pressure welded. An explosive cartridge was employed wherein 1.2 g. of PETN was charged under 250 kg./cm.² in the shell A as described in Example 3. 15 explosive cartridges were disposed on the center line of the titanium plate in the longitudinal direction at a 50 mm. spacing. An explosive in a cord form of 3 by 4 mm. cross-section, consisting of 70% of PETN, 15% of paraffin and 15% of petrolatum, was inserted into the cartridges and connected one to another. Complete pressure welding at the positions where the explosive cartridges were disposed on the aforementioned metal plate was effected through detonation employing electric detonator No. 6 at one end. Average shearing strength of the respective pressure-welded part was 1,900 kg.

*Example 5*

A base of 12 mm. thick mild steel plate (JIS SS–41) of 300 by 500 mm. area and a 1 mm. thick titanium plate (JIS ST–60) of the same area as that of the base metal were employed as the materials to be pressure-welded. The explosive cartridges were formed by charging 1.2 g. of PETN under 250 kg./cm.² pressure into shells A as described in Example 3, and then charging 0.3 g. of DDNP with no compression, and an electric ignitor was provided. 15 explosive cartridges were disposed on the surface of the titanium plate in three rows of 5 cartridges each so that the distances between the adjacent rows as well as between the adjacent cartridges in a row was 100 mm. respectively. The leg wires for electric ignition provided for every cartridge were connected in series and ignition was carried out from a DC 100 volt power source. Complete pressure welding at the 15 positions on the aforementioned metal plate was effected through detonation. The average shearing strength of each pressure-welded part was 1,780 kg.

As explained in the foregoing, the spot welding of the present invention is extremely useful in many aspects. According to the present invention, it is possible to apply pressure welding to thin plates employing a small amount of explosives and without causing any change in the quality of the plate which has heretofore been difficult or impossible in the conventional welding methods. Furthermore, the method according to the invention can be effected without employing any special equipment or supporters, and pressure welding can be carried out simply by putting the plates one upon another and placing the explosives thereon with no requirement of special techniques. It is to be noted that the method can be applied to pure metals such as steel, iron, copper, tin, aluminum, nickel, chromium, cobalt, titanium, niobium, magnesium, tungsten, zirconium, beryllium, molybdenum, tantalum vanadium, silver, gold, platinum, etc., or alloys thereof.

Further, the spot welding of the present invention enables its application to ceilings, wall surfaces, or in narrow spaces, and the mechanical strength of the pressure-welded parts is at least twice that obtained by the conventional electric resistance spot welding. Furthermore, even if processing such as bending is carried out on the materials after the pressure welding has been effected, no disturbance occurs in the pressure-welded parts. The present invention therefore has many advantages in the wide use of materials and has wide industrial application such as the lining of chemical apparatus in architecture, vessels and vehicles, etc.

What is claimed is:

1. Apparatus for spot welding a plurality of metal plates by explosive welding, said apparatus comprising a container of cylindrical shape and means in said container which produces an explosion upon detonation, said container including a base adapted for being placed on the outer surface of one of the plates, said base having an inner surface of convex shape to concentrate the force of the explosion in a localized area and adhesive means on the outer surface.

2. Apparatus as claimed in claim 1 wherein said inner surface is spherical.

3. Apparatus as claimed in claim 1 wherein said container is a fibrous material, rubber or a synthetic resin.

4. Apparatus as claimed in claim 1 wherein said container has a lower edge at said base, and a peripheral cut-off region at said lower edge.

5. Apparatus as claimed in claim 4 wherein said cut-off region is of conical shape.

6. Apparatus as claimed in claim 4 wherein said cut-off region is of rounded shape.

7. Apparatus as claimed in claim 1 wherein said adhesive means is a non-metallic adhesive layer.

8. Apparatus as claimed in claim 1 wherein said adhesive means is a piece of tape having opposite surfaces with a non-metallic adhesive thereon.

9. Apparatus as claimed in claim 1 comprising a plurality of containers in addition to the first said container, and means connecting the explosive in the containers for propagating detonation from container to container.

10. Apparatus as claimed in claim 9 wherein the explosive means in each container contains means which is electrically detonated, said means for propagating detonation comprising means for supplying electricity to the explosive means in successive containers.

11. Apparatus as claimed in claim 9 wherein the means for propagating detonation comprises a cord connecting the explosive means in successive containers.

References Cited

UNITED STATES PATENTS

| | | | |
|---|---|---|---|
| 2,604,042 | 7/1952 | Cook | 29—421 |
| 2,605,703 | 8/1952 | Lawson | 102—24 |
| 2,667,836 | 2/1954 | Church et al. | 29—421 |
| 2,856,850 | 10/1958 | Church et al. | 102—24 |
| 3,120,827 | 11/1964 | Abegg et al. | 29—421 |
| 3,212,183 | 10/1965 | Burman et al. | 29—421 |

JOHN F. CAMPBELL, *Primary Examiner.*

P. M. COHEN, *Assistant Examiner.*